United States Patent
Shabtay et al.

(10) Patent No.: US 6,928,049 B2
(45) Date of Patent: Aug. 9, 2005

(54) MODULAR BRIDGING-DEVICE

(75) Inventors: Lior Shabtay, Ganei Tikva (IL); Amir Gonen, Tel Aviv (IL); Moshe Island, Yehud (IL); Guy Kronenthal, Givat Shmuel (IL); Evgenia Jenny Shteinberg, Le Zion (IL); Ygdal Naouri, Tel Aviv (IL)

(73) Assignee: Avaya Communication Israel Ltd., Tel Aviv (IL)

( * ) Notice: Subject to any disclaimer, the term of this patent is extended or adjusted under 35 U.S.C. 154(b) by 36 days.

(21) Appl. No.: 10/638,826

(22) Filed: Aug. 11, 2003

(65) Prior Publication Data

US 2004/0047336 A1 Mar. 11, 2004

Related U.S. Application Data

(63) Continuation of application No. 09/378,880, filed on Aug. 23, 1999, now abandoned.

(51) Int. Cl.$^7$ .............................................. H04L 12/26
(52) U.S. Cl. ...................... 370/223; 370/426; 370/424; 370/242
(58) Field of Search ................................. 370/216–228, 370/242–251, 423–424, 426

(56) References Cited

U.S. PATENT DOCUMENTS

| | | | | |
|---|---|---|---|---|
| 5,751,710 A | * | 5/1998 | Crowther et al. | 370/423 |
| 5,802,333 A | * | 9/1998 | Melvin | 710/316 |
| 5,892,932 A | * | 4/1999 | Kim | 710/316 |
| 5,923,643 A | * | 7/1999 | Higgins et al. | 370/218 |
| 6,154,449 A | * | 11/2000 | Rhodes et al. | 370/254 |
| 6,373,840 B1 | * | 4/2002 | Chen | 370/360 |

OTHER PUBLICATIONS

"Lucent Product Support", by Ori Bendori, /www.Iannet-.com/site/products/white/safwp-05.htm, Pp. 1-7,available Aug. 3, 1999.
"Truncating tree timing", Mick Seaman, IEEE 802.1 interim meeting, Rev. 1.0 Monday, JAn. 11th, 1999, Pp. 1-4.
"Speedy Tree Protocol", Mick Seaman, IEEE 802.1 interim meeting, Rev. 1.0 Saturday, Jan. 16th, 1999, Pp. 1-16.
"Information technology—Telecommunication and Information exchange between systems —Local and metropolitan area networks —Media Access Control (MAC) Bridges", International Standard ISO/IEC 15802-3, 1998, ANSI/IEEE Std 802.ID 1998 edition. pp. 58-109 and 280-287.
"Information technology —Telecommunications and information exchange between systems —Local and metropolitan area networks —Part 3: Carrier sense multiple access with collision detection (CSMA/CD) access method and physical layer specifications", IEEE Std 802.3, 1998 Edition, chapters 24 and 37, Pp. 611-647 and 970-993.

* cited by examiner

*Primary Examiner*—Chi Pham
*Assistant Examiner*—Thai Hoang (57) ABSTRACT

A method of managing connectivity of a cluster of bridging-devices including a plurality of links. The method includes pre-designating at least one of the links as a redundant link which is blocked when all the other links are operative and connected in accordance with a predetermined scheme, determining connectivity data on the connectivity of the links of the cluster, and activating or blocking the pre-designated redundant at least one link responsive to the connectivity data.

28 Claims, 3 Drawing Sheets

MODULAR BRIDGING-DEVICE

CROSS REFERENCE TO RELATED APPLICATIONS

This application is a continuation of the U.S. application identified by Ser. No. 09/378,880, filed Aug. 23, 1999 now abandoned, the disclosure of which is incorporated by reference herein.

FIELD OF THE INVENTION

The present invention relates to communication networks and in particular to broadcast protocols in local area networks.

BACKGROUND OF THE INVENTION

Local communication networks generally comprise a plurality of bridging-devices and communication links. Each communication link connects between two or more bridging-devices or between one or more bridging-devices and one or more end-stations, e.g., computers. Each bridging-device comprises a plurality of ports which serve as interfaces between the bridging-device and the links to which it is connected. When a source station sends a message or frame to a destination station whose address is recognized by all the bridging-devices, the source station forwards the message to a bridging-device which forwards the frame to one of its neighboring bridging-devices (bridging-devices which are directly connected to a common link are referred to herein as neighbors). The neighboring bridging-device forwards the frame to another bridging-device until the frame finally reaches the bridging-device connected to the destination station. In many cases, frames are broadcast to all the bridging-devices in a local network.

A commonly used broadcast scheme involves having a bridging-device that receives a broadcast frame forward the frame through all its ports, except for the port through which the frame was received. This broadcast scheme operates properly only if the ports and links do not form a loop in the network. If the network includes a loop of ports, a single frame may be repeatedly forwarded through the network and the network will fail. Such a situation is commonly referred to as a broadcast storm.

In many cases redundant links are added to networks, to be used in case one or more of the bridging-devices and/or links fail. A spanning tree algorithm (STA) is commonly used to block the ports leading to the redundant links and thus prevent the formation of loops. A blocking port (also referred to as a port in a blocked state, or as a blocked port) only sends specific control packets (i.e., STA-BPDU packets) and does not forward data packets at all. Usually, bridging-devices which are reset or begin to operate, block all their ports and then the STA activates those ports which are to be used for forwarding data.

One common spanning tree algorithm is the 802.1D standard spanning tree algorithm (STA) which is described in "Information technology—Telecommunications and information exchange between systems—Local and metropolitan area networks—Media access control (MAC) bridges", International Standard ISO/EEC 15802-3, 1998, ANSI/IEEE Std 802.1D, 1998 edition, the disclosure of which is incorporated herein by reference. Faster STAs are described in "Speedy Tree Protocol" and "Truncating Tree Timing", both of which are to M. Seaman, IEEE 802.1 interim meeting, January 1999.

Stackable switches are bridging-devices which are formed internally by a plurality of bridging-devices, connected by internal links. An advantage of stackable switches is that a system manager may add bridging-devices to the stackable switch in order to enhance its operation with minimal changes in the stackable switch, and without changes in the network to which the stackable switch is connected. The convergence time of commonly used STAs is dependent on the number of bridging-devices along the longest path in the network. Therefore, it is preferred that stackable switches participate in STAs as a single switch. Under these circumstances, the STA does not prevent formation of loops within the stackable switch, and therefore the stackable switch is not allowed to include redundant links.

In most local networks, control data on the connectivity of the network is passed along the links of the network which forward data. The connectivity data is used, for example, in running STAs. Still, some stackable switches include separate wire connections, connected in parallel to the data links, which pass only control data.

In some networks described, for example, in a white paper by Ori Bendori, titled "Lucent product support", and available at /www.lannet.com/site/products/white/safwp-05.htm, the disclosure of which is incorporated herein by reference, redundant links are handled locally by a single bridging-device, rather than by using an STA which is a distributed algorithm and is relatively complex. The bridging-device includes active ports and blocked ports. If a failure is detected in one of the active ports the bridging-device automatically activates a predetermined one of the blocked ports. Thus, the failure is overcome relatively quickly. This scheme, however, is limited to networks in which a single bridging-device is connected to both the failing link and the redundant link which replaces the failing link.

SUMMARY OF THE INVENTION

It is an object of some preferred embodiments of the invention to provide a fast method for managing connectivity without formation of loops within a stackable switch which includes redundant links.

One aspect of some preferred embodiments of the present invention relates to a method of managing a spanning tree within a cluster of bridging-devices. One or more links of the cluster are pre-designated as redundant links which are activated in case other links of the network fail. Preferably, each redundant link is associated with one or more links, the failure of which (in combination and/or alternatively) induce the activation of the redundant link. Preferably, the predetermined links are not necessarily connected to a common bridging-device with all the associated links. Preferably, when a link fails, a bridging-device adjacent the failed link notifies a bridging-device which is adjacent the redundant link associated with the failed link. The notified bridging-device then activates the redundant link. Except for possibly passing the message that a link has failed, the other bridging-devices are not involved in the activation and preferably no STA is involved in activating the links of the cluster.

In some preferred embodiments of the present invention, a cluster includes one or more loops of links. One of the links in each loop is pre-designated as a redundant link which is activated if any of the other links in the loop fails. In a preferred embodiment of the present invention, the entire cluster has a ring topology which includes a single loop.

Alternatively or additionally, the cluster includes more than one loop.

In some preferred embodiments of the present invention, the cluster has a systematic topology which allows addition and/or removal of bridging-devices from the cluster without necessitating changes in the rules of activating redundant links.

In some preferred embodiments of the present invention, the bridging-devices of the cluster are connected through a control wire separate from the links of the cluster. The bridging-devices use the control wire to notify the bridging-device adjacent the redundant link about failures. In other embodiments, a failure message is sent via the active links.

There is therefore provided in accordance with a preferred embodiment of the present invention, a method of managing connectivity of a cluster of bridging-devices including a plurality of links, including pre-designating at least one of the links as a redundant link which is blocked when all the other links are operative and connected in accordance with a predetermined scheme, determining connectivity data on the connectivity of the links of the cluster, and activating or blocking the pre-designated redundant at least one link responsive to the connectivity data.

Preferably, pre-designating at least one of the links includes pre-designating links which are in excess of the number of links required to form a spanning tree of the cluster.

Preferably, pre-designating at least one of the links includes pre-designating at least one redundant link for each loop in the cluster.

Preferably, determining the connectivity data includes determining the operability of at least one of the links of the cluster. Alternatively or additionally, determining the connectivity data includes determining the operability of a plurality of links associated with the redundant link.

Preferably, determining the connectivity data includes determining whether a loop of operative links including the redundant link exists in the cluster. Further preferably, activating or blocking the redundant link includes blocking the redundant link if all of the links in the loop are operative, and activating the redundant link if at least one of the links in the loop is inoperative.

There is further provided in accordance with a preferred embodiment of the present invention, a method of managing connectivity of a cluster of bridging-devices including a plurality of normally active primary links and at least one normally blocked redundant link, including receiving, by a managing bridging-device, which is directly connected to at least one of the redundant links, information on the operability of a group of the primary links, from at least one other bridging-device, and blocking or activating the redundant link responsive to the operability information.

Preferably, receiving the information includes receiving the information on a wire independent of the primary links. Preferably, receiving the information includes receiving a binary signal. Further preferably, the binary signal is a result of a logical operation applied to signals generated respectively by a plurality of the bridging-devices of the cluster.

Preferably, the group of primary links defines a ring topology with the redundant link.

Preferably, blocking or activating the redundant link includes blocking the redundant link if all of the primary links in the group are operative, and activating the redundant link if at least one of the links in the group is inoperative.

Preferably, a link is considered operative if it is operative and is connected to at least two operative ports of at least two powered operative links.

Preferably, the group of primary links includes at least one link not directly connected to the managing bridging-device.

Preferably the method includes notifying by the managing bridging-device to at least one of the other bridging-devices in the cluster before the managing bridging-device activates the redundant link.

Preferably the method includes waiting a predetermined period in which no changes occur in the operation of the links of the group before activating the redundant link.

Preferably, the managing bridging-device is connected to the redundant link through a predetermined port. Further preferably, only the managing bridging-device is permitted to change the status of an operative link from active to blocked.

There is further provided in accordance with a preferred embodiment of the present invention, a method of managing activity of ports of a bridging-device belonging to a cluster of bridging-devices, including determining whether the bridging-device is connected to a specific link serving as a redundant link, and if the bridging-device is directly connected to the redundant link, receiving information by the directly connected bridging-device on the operability of a group of the primary links, and determining whether to block the link responsive to the received information.

There is further provided in accordance with a preferred embodiment of the present invention, a modular switch, including a plurality of bridging devices, a plurality of primary links connecting the bridging-devices, a redundant link, and a control wire which carries a signal indicative of the operability of at least one of the primary links, at least one of the bridging-devices determines whether the redundant link should be blocked responsive to the signal on the control wire.

Preferably, the switch includes a feedback control wire which carries a signal which indicates whether the redundant link is blocked.

Preferably, the at least one bridging-device which determines whether the redundant link should be blocked is substantially identical in its hardware to the other bridging-devices. Further preferably, the at least one bridging-device which determines whether the redundant link should be blocked runs substantially identical software as the other bridging-devices.

Preferably, the group of primary links and the redundant link define a ring topology.

There is further provided in accordance with a preferred embodiment of the present invention, a plurality of identical bridging-devices including internal ports, and a plurality of data links connecting the plurality of bridging-devices, wherein a specific one of the identical bridging-devices determines whether to activate or block its internal ports in a manner different from the other bridging-devices. Preferably, only the specific bridging device may block an operative link. Further preferably, the specific bridging device includes a bridging device connected to a link which is normally blocked.

BRIEF DESCRIPTION OF FIGURES

The invention will be more clearly understood by reference to the following description of preferred embodiments thereof in conjunction with the figures, in which.

DETAILED DESCRIPTION OF THE PREFERRED EMBODIMENTS

Figure 1:
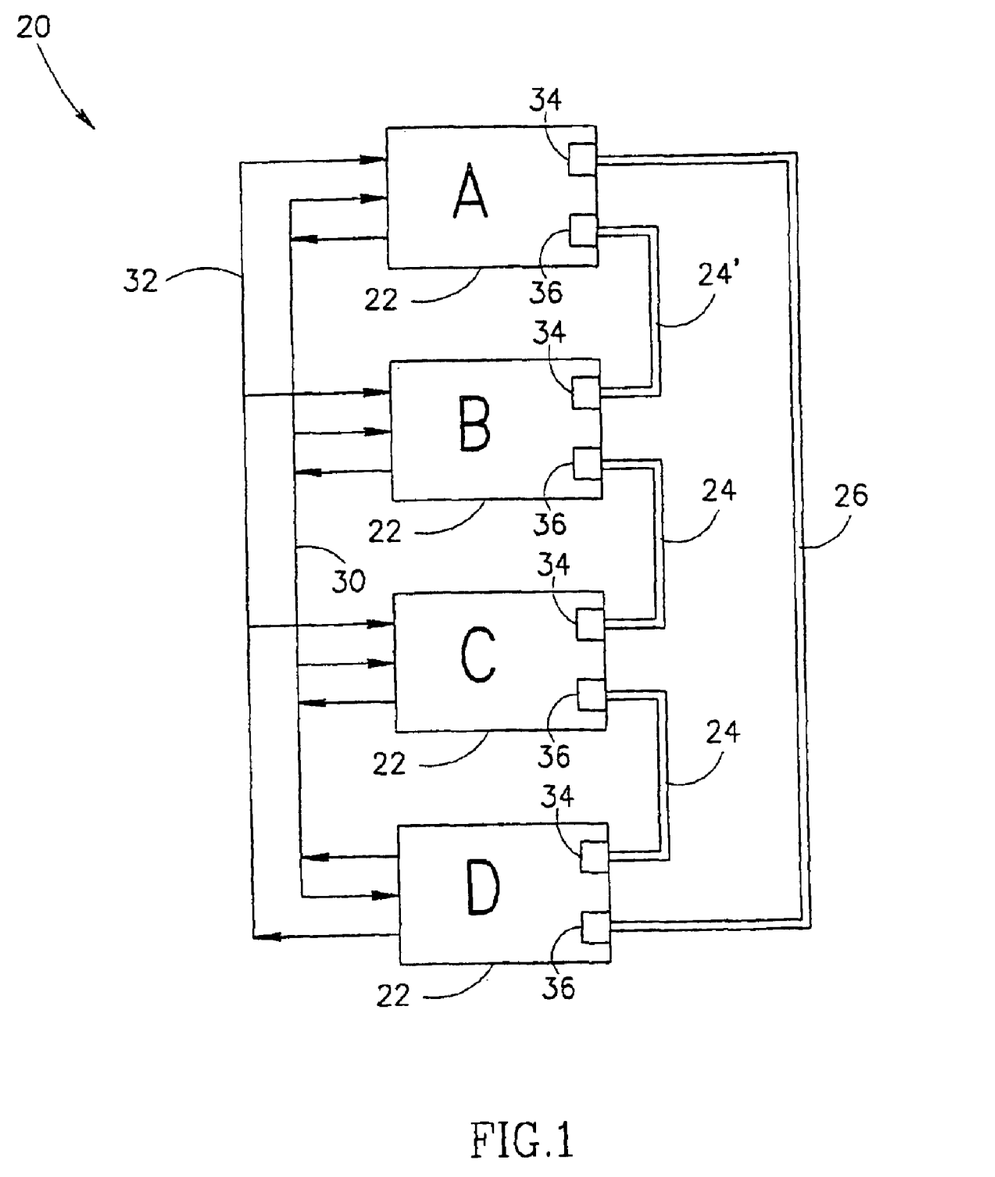
FIG. 1 is a schematic illustration of a stackable switch, in accordance with a preferred embodiment of the present invention.

FIG. 1 is a schematic illustration of a stackable switch 20, in accordance with a preferred embodiment of the present invention. Switch 20 comprises a plurality of bridging-devices 22 which are conventionally stacked one on top of the other defining a top bridging-device 22A and a bottom bridging-device 22D. Switch 20 may comprise substantially any number of bridging-devices 22 although typically the number ranges between one and ten. Each two neighboring bridging-devices, e.g., 22B and 22C, are preferably connected by a data link 24. In addition, a redundant link 26 connects bottom link 22D to top link 22A, thus forming a ring topology of bridging-devices 22.

In a preferred embodiment of the present invention, bridging-devices 22 have two internal ports, an upper port 34 and a lower port 36, which are used to connect to links 24 and/or 26.

Each of bridging-devices 22 is preferably connected to a control wire 30 which carries one or more signals indicative of the operation of links 24. In a preferred embodiment of the present invention, control wire 30 carries a single signal, referred to as Link To Top (LTT), which is indicative of the operation of all of links 24 in switch 20. Preferably, when all of links 24 are operative, wire 30 carries a logical '1' signal and when at least one of links 24 is inoperative, wire 30 carries a logical '0' signal.

Preferably, each bridging-device 22 generates a local output signal—Link To Neighbors (LTN), which indicates whether the links 24 directly connected to the bridging-device are operative. A method for determining whether links 24 connected to the bridging-device 22 are operative is described hereinbelow. The LTT signal on wire 30 is preferably a logical function, preferably a logical AND, of all the local LTN signals.

In a preferred embodiment of the present invention, wire 30 is connected to bridging-devices 22 using an open collector technique. In the open collector technique if none of bridging-devices 22 pull down the value of LTT on wire 30, the value of LTT is a logical '1'. When a bridging-device 22 detects an inoperative link 24 it pulls down the value on wire 30. Alternatively, two bridging-devices 22 must report a failure in order to set LTT to a logical '0'. This is because a link failure is always detected by two bridging-devices 22. Preferably, bridging-devices 22 which are not powered (not operative) do not affect the value of LTT on wire 30. The neighboring bridging-devices of the non-powered bridging-device will indicate in their local LTN signal that the bridging-device is not powered. Alternatively, bridging-devices 22 which are not powered, e.g., not connected to an electricity source, generate a logical '0' on their local LTN signal.

Preferably, all of bridging-devices 22 write to wire 30 and only bottom bridging-device 22D reads the value on wire 30. Alternatively, all of the bridging-devices 22 may read from wire 30 in order to keep track of the status of the connectivity in switch 20, for reasons described hereinbelow.

In some preferred embodiments of the present invention, an additional control wire 32 which carries a control signal indicative of the operation of redundant link 26 is connected to each of bridging-devices 22. Preferably, bottom bridging-device 22D writes to wire 32 and the rest of bridging-devices 22 read from wire 32. In a preferred embodiment of the present invention, bridging-devices 22 check the value on wire 32 before they activate links 24 which were previously blocked in order to prevent formation of a loop of active links in switch 20.

In normal operation of switch 20, all the ports of bridging-devices 22 leading to links 24 are active. In addition, one of the ports leading to redundant link 26 is kept active while the other port is blocked. This prevents data from passing through redundant link 26, and causing a broadcast storm. For the following description it is assumed, without loss of generality, that the port from top bridging-device 22A to redundant link 26 is active, while the port from bottom bridging-device 22D to redundant link 26 is blocked. In the normal operation, wire 30 carries a logical '1' signal indicative of the operation of all of links 24, and wire 32 carries a logical '0' signal which indicates that redundant link 26 is not in use.

Figure 2:
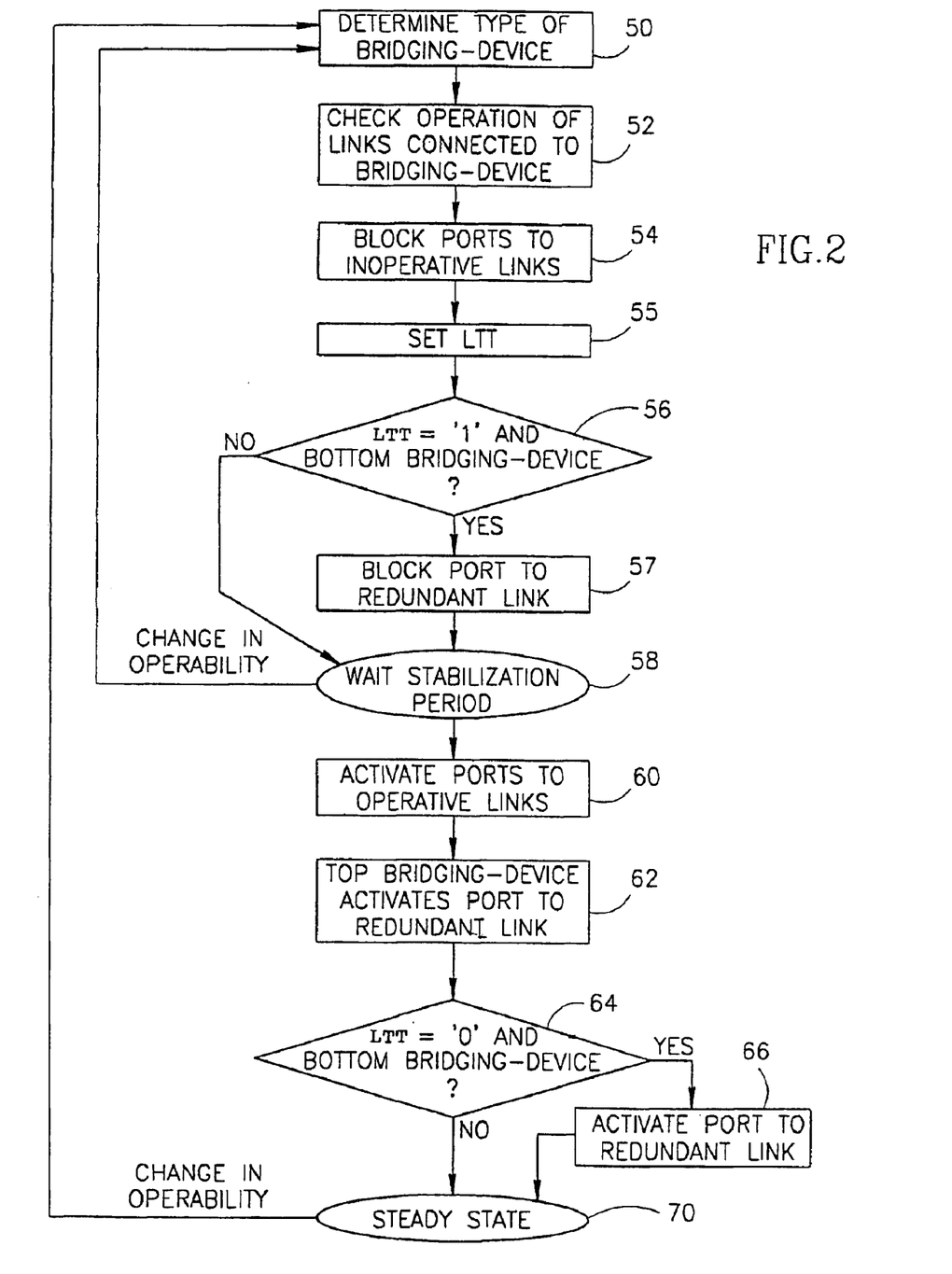
FIG. 2 is a flow chart of the actions performed by the bridging-devices forming the stackable switch of FIG. 1, in accordance with a preferred embodiment of the present invention.

FIG. 2 is a flow chart of the actions performed by bridging-devices 22, in accordance with a preferred embodiment of the present invention. The method of FIG. 2 is a distributed method in which each of bridging-devices 22 operates separately. Upon being powered or reset, each bridging-device 22 preferably blocks its ports 34 and 36. The bridging-device 22 then preferably determines (50) its type, e.g., if it is a top or bottom bridging-device 22A or 22D. Preferably, all of bridging-devices 22 are identical and only their connections determine if they are top or bottom bridging-device 22A or 22D. In a preferred embodiment of the invention, the connection of redundant link 26 to a bridging-device 22 notifies the bridging-device that it is an upper or lower bridging-device. Preferably, one side of redundant link 26 can be connected only to an upper port 34 while the other side of redundant link 26 is connectable only to a lower port 36. Thus, it is not possible to connect redundant link 26 to two bridging-devices 22 which identify themselves as bottom bridging-devices. Alternatively or additionally, bridging-devices 22 comprise a separate socket or switch which is used to notify them that they are top or bottom bridging-devices. Alternatively, top bridging-device 22A and/or bottom bridging-device 22D are different from the other bridging-devices 22 and are internally set as top and/or bottom bridging-device. Those bridging-devices 22 which are not top or bottom devices are referred to herein as inner devices.

Thereafter, each bridging-device 22 checks (52) whether the links 24 and 26 to which it is connected are operative. Preferably, a link 24 is considered operative only if in addition to being operative it is connected to a powered bridging-device 22, through an operating port 34 or 36.

Preferably, dedicated hardware is used to signal the operation of links 24 and 26, as described, for example, in chapters 24 and/or 37 of IEEE standard 802.3, 1998 edition, the disclosure of which is incorporated herein by reference. In a preferred embodiment of the present invention, each bridging-device 22 receives, in addition to the operation signals of links 24 and 26, four input signals which indicate the status of the links to which the bridging-device is connected. The four input signals preferably include an Upper Box Present (UBP) signal which indicates whether a link 24 is connected via upper port 34 to a powered neighboring bridging-device 22. Likewise, the input signals preferably include a Lower Box Present (LBP) signal which indicates whether a link 24 is connected via lower port 36 to a powered neighboring bridging-device 22. It is noted that in this embodiment the LBP signal, for example, may indicate operativeness while the signal of the link indicates the link is inoperative. Therefore both of the signals are preferably checked. Two other input signals preferably include a Top Long Cable Present (TLCP) signal and a Bottom Long Cable Present (BLCP) signal which indicate whether the bridging-device is connected via upper port 34 or lower port 36 to redundant link 26 with a powered neighboring bridging-device on the other side of the redundant link.

Alternatively or additionally, software routines are used to determine whether the links connected to the bridging-devices 22 are operative. In a preferred embodiment of the present invention, each bridging-device 22 sends periodically a Bridge Protocol Data Unit (BPDU) to its neighbors. A bridging-device 22 which does not receive a BPDU through one of its ports 34 and 36 for a predetermined time, concludes that the link connected to that port is inoperative.

Preferably, after the operation of links 24 is determined, those ports leading to inoperative links 24 are blocked (54), if they are not blocked already. Alternatively, the ports to inoperative links are blocked during step 60 when the ports leading to operative links are activated. The ports are preferably blocked so that if an inoperative link suddenly operates it does not form a loop and cause a traffic storm.

It is noted that only bottom bridging-device 22D blocks an operative link (i.e., redundant link 26) for substantial periods. Bottom bridging-device 22D also may convert its port 36 leading to redundant link 26 from an active state to a blocked state although the redundant link remains operative. Other bridging-devices 22 only block inoperative links 24, and keep them blocked after they become re-operative only for a short period until redundant link 26 is blocked.

Based on the operation of the links 24, the bridging-devices 22 set (55) the value of the LTT signal on control wire 30. Inner bridging-devices 22 should be connected to two operative links 24 and top and bottom bridging-devices 22A and 22D should be connected to a single link 24. Bridging-devices 22 which are connected to the number of operative links 24 which they should be connected to, preferably, do not perform any action as operation of links 24 is the default on wire 30. Bridging-devices 22 which are connected to at least one inoperative link 24, or are connected to fewer than the number of operative links 24 which they should be connected to, set the LTT value on wire 30 to a logical '0'. Preferably, as described above, wire 30 operates based on an open collector technique, such that in the absence of a bridging-device which pulls down the value of LTT, the value of LTT remains '1'.

The setting of LTT to '0' signals to bottom bridging-device 22D to activate link 26. Therefore, the bridging-device 22 setting LTT to '0' preferably blocks (step 54) its port 34 or 36 to its inoperative link 24 before it set LTT (step 55). This is important to prevent formation of a loop in case the failure of the link 24 was just a short flicker.

In a preferred embodiment of the present invention, after LTT is set, bottom bridging-device 22D blocks (57) its lower port 36 which leads to redundant link 26, if (56) LTT='1'. Redundant link 26 is blocked before a re-operating link 24 is activated in order to prevent formation of loops in switch 20. Alternatively, the blocking of redundant link 26 is performed after the stabilization period.

In some preferred embodiments of the present invention, at this point bridging-devices 22 wait (58) for a stabilization period in order to make sure that switch 20 is stable. The stabilization period prevents formation of transient loops which may cause transient broadcast storms within switch 20. The stabilization period prevents formation of transient loops by preventing hasty activation of links 24 or 26. The stabilization period ensures that the other bridging-devices 22 are in step with the bridging-device 22 performing the activation, for example when switch 20 is operated. In addition, the stabilization period allows time for other bridging-devices 22 in switch 20 to perform changes without forming a chain reaction of changes. Stabilization period 58 preferably is between 0.1–1 seconds, although it may have other lengths depending on the specific implementation of switch 20.

Preferably, during the stabilization period bridging-devices 22 check for changes in the operability of the links 24 to which they are connected. Alternatively, some of the bridging-devices 22 check the operability of less than all the links 24 to which they are connected. Bridging-devices 22 are preferably assigned with links 24 in a manner in which each link 24 is assigned at least one bridging-device 22 which constantly checks the operation of the link.

In some preferred embodiments of the present invention, the operability of redundant link 26 does not affect the actions performed by bridging-devices 22 and therefore the operability of redundant link 26 is not checked during the stabilization period and/or is not checked at all. Alternatively, when redundant link 26 is inoperative bridging-devices 22 stop checking the operation of links 24 since there is no way to compensate for failures in links 24.

Preferably, failures in links 24 and/or 26 are determined by the hardware of switch 20, which generates an interrupt in one or more of bridging-devices 22 responsive to the failure. Alternatively or additionally, bridging-devices 22 periodically perform hardware and/or software routines which verify the proper operation of links 24. Preferably, the operation check is performed periodically at a relatively high rate.

If any changes in the signals occur during the stabilization period the bridging-device 22 preferably returns to step 50. Alternatively, bridging-device 22 returns to step 50 if the signal change could affect the type of the bridging-device, and returns to step 52 if the signal change only affects the operability of links connected to the bridging-device 22. Such changes which do not affect the type include changes in the operability of links 24.

After the stabilization period, each bridging-device 22 activates (60) its ports which are connected to operative links 24. Top bridging-device 22A activates (62) its upper port 34 which is connected to redundant link 26, regardless of whether the redundant link is operative. Alternatively, top bridging-device 22A activates (62) its upper port 34 only if redundant link 26 is operative. If (64) LTT='0', that is at least one of links 24 is inoperative, bottom bridging-device 22D activates (66) its lower port 36 which leads to redundant link 26. If, however, LTT='1', all of links 24 are operative and lower port 36 of bottom bridging-device 22D remains blocked.

At this point switch 20 preferably moves into a steady state (70) in which the ports remain in their prior states (active, blocked) unless a change in the operability of one or more links occurs. During the steady state, bridging-devices 22 preferably keep track of changes in the connectivity of links 24 in a manner similar to that performed during the stabilization period.

In a preferred embodiment of the present invention, during the stabilization period, the connectivity information is determined substantially only using hardware signals, such as, UBP, LBP, TLCP, BLCP and the hardware signals associated with the links. In the steady state of this embodiment, the connectivity is determined using both hardware signals and one or more software routines, such as the software routines described hereinabove. In a preferred embodiment of the present invention in which bridging-devices 22 poll the connectivity signals periodically, the rate of polling is different between the stabilization period and the steady state. Preferably, during the steady state the polling rate is lower than during the stabilization period. Preferably, changes in operability are handled in substantially the same manner during the steady state as during the stabilization period.

During the steady state, bottom bridging-device 22D preferably constantly checks for changes of the LTT signal carried by wire 30. Alternatively or additionally, any change in the value on wire 30 induces an interrupt in bottom bridging-device 22D. Preferably, when the value of LTT on wire 30 changes, bottom bridging-device 22D returns to step 50 to check whether other changes have occurred and wait the stabilization period. This prevents rapid changing of the status of lower port 36 of bottom bridging-device 22D, which rapid changing may cause errors in the operation of switch 20, for example a transient loop which causes a transient traffic storm. Alternatively or additionally, all of bridging-devices 22 listen to the value on wire 30 and when a change occurs in this value all of bridging-devices 22 return to step 50 to check whether other changes have occurred in switch 20. Further alternatively, when a change occurs in the value on wire 30 bridging-device 22D returns to step 64 for setting the status of lower port 36 which connects to redundant link 26, and does not wait the stabilization period.

It is noted that a link 24 may become inoperative in many ways. A link may become inoperative due to a reset of one or more bridging-devices 22 in switch 20 or due to a failure of a bridging-device 22. Another cause of an inoperative link 24 is a hot swap of a bridging-device 22, i.e., the removal of a bridging-device 22 by a system operator while switch 20 is in use. Other failures are due to failure or disconnection of a link 24.

When one or more bridging-devices 22 are reset, the method of FIG. 2 is immediately performed by the reset devices. Preferably, the reset is immediately detected by neighboring bridging-devices (bridging-devices directly connected to the reset device) which realize that the bridging-device on the other side of one of their links 24 is not operative. In a preferred embodiment of the present invention, the UBP or LBP signals of the neighboring bridging-devices indicate that the reset bridging-device became inoperative. The neighboring bridging-devices, therefore, preferably immediately set LTT to '0'. Responsive to the change in LTT, bottom bridging-device 22D preferably enters the stabilization period before activating redundant link 26. During the stabilization period the reset bridging-device becomes operative again and the neighboring bridging-devices change their LTN signals back to '1', which in the absence of other failures causes LTT to become '1'. Preferably, this occurs during the stabilization period of bottom bridging-device 22D, such that redundant link 26 is not activated. Alternatively, the neighboring bridging-devices immediately cause bottom bridging-device 22D to activate port 36 to redundant link 26. When the reset bridging-devices 22 become operative again they change LTT causing the port 36 to redundant link 26 to be blocked again. Thus, even when switch 20 is disrupted for a short period redundant link 26 comes into operation.

When a link 24 fails or is disconnected, the two bridging-devices 22 connected through the link identify the failure. These bridging-devices return to step 50 and in step 55 change the value of LTT to '0'. Responsive to this change bottom bridging-device 22D preferably returns to step 50 and activates port 36 to redundant link 26 (step 66), after the stabilization period (step 58).

In case a bridging-device 22 is removed from switch 20, the neighboring bridging-devices of the removed bridging-device detect a change in the operation of their links 24 and return to step 50 in FIG. 2. In step 55 the neighboring bridging-devices set LTT to '0' causing bottom bridging-device 22D to activate port 36 to redundant link 26.

When an inoperative link 24 becomes re-operative, the change is detected by the bridging-devices 22 connected to the link. These bridging-devices return to step 50 of FIG. 2 and in step 55 change the value of LTT. If all the other links 24 are operative, the LTT signal on wire 30 changes to '1' and bottom bridging-device 22D blocks its port 36 to redundant link 26. The bridging-devices connected to the re-operating link 24 preferably activate their ports to the re-operating link only after the stabilization period which is longer than the expected time required by bottom bridging-device 22D is to block (step 57) port 36 to redundant link 26. Alternatively, the bridging-devices connected to the re-operating link 24 preferably activate their ports to the re-operating link only after the signal on wire 32 notifies that redundant link 26 was blocked. In a preferred embodiment of this alternative of the invention, the step of waiting 58 the stabilization period is eliminated. As the step of waiting is the only time consuming step in the method of FIG. 2, the convergence time of switch 20 in this embodiment is dependent only on the response time of hardware signals and of the software associated with these signals implementing the method of FIG. 2. This response time is generally measured in milliseconds. Further alternatively, the bridging-devices activate their ports to the re-operative link irrespective of the actions of bottom bridging-device 22D. It is noted that an active loop may be formed in switch 20 due to this action, but the time in which the loop will cause a broadcast storm will be very short.

When a new bridging-device 22 is inserted into switch 20 some links 24 are first disconnected to make room for the new bridging-device. Therefore, the bridging-devices 22 of switch 20 will perform a series of status changes until the switch returns to steady state with a new configuration.

In some preferred embodiments of the present invention, bridging-devices 22 use the value on wire 32 for a cross-check which determines whether switch 20 is stable. Preferably, all of bridging-devices 22 perform the cross-check. The cross-check is preferably performed after waiting 58 the stabilization period. Alternatively or additionally, the cross-check is performed periodically during the steady state of switch 20. During the cross-check, bridging-device 22 checks whether the values on wires 30 and 32 contradict. A contradiction occurs when wire 30 indicates that at least one of links 24 is inoperative, while wire 32 indicates that port 36 of bridging-device 22D is blocked leaving redundant link 26 unused. Another contradiction occurs in the opposite case when wire 30 indicates that all of links 24 are operative, while wire 32 indicates that redundant link 26 is unblocked.

If a contradiction is detected by a bridging-device 22, the bridging-device preferably waits a predetermined time-out period to see whether the contradiction is resolved. The time-out period is preferably about of the length of stabilization period 58. If the contradiction is not resolved within the time-out period, the bridging-device 22 preferably resets itself attempting to cause the contradiction to be resolved.

Alternatively, the unstable bridging-device 22 sends a message to all the bridging-devices 22 of switch 20 to simultaneously reset in an attempt to resolve the contradiction. Preferably, the unstable bridging-device 22 sends the message using an additional control wire, not shown, which is connected to all the bridging-devices 22 in switch 20.

Alternatively or additionally, a message calling for human intervention in order to solve the contradiction, is generated. Further alternatively or additionally, only if the reset did not solve the contradiction, human intervention is called for. In a preferred embodiment of the present invention, a bridging-device 22 which detects a contradiction is reset for a few times. If the contradiction persists, the bridging-device preferably blocks both of ports 34 and 36 so as not to obstruct the operation of the rest of switch 20, in case the contradiction is due to a fault in the bridging-device detecting the contradiction. If all the bridging-devices 22 detect the contradiction they will all block their ports and wait for human intervention.

Referring back to step 50 of determining the type of the bridging-device, in some preferred embodiments of the invention, the results of the type determination are used by other procedures run on some or all of the bridging-devices 22 of switch 20. For example, the type determining may be used by a procedure which counts and/or orders the bridging-devices 22 within switch 20. In some preferred embodiments of the present invention, the step of type determination (50) defines more than the three types described above, for the convenience of these procedures. In a preferred embodiment, bridging-devices 22 are divided to six types according to their connectivity data. The six types include: top, bottom and inner, which are described above, and extreme-up, extreme-down and stand-alone. The extreme-up and extreme-down types refer to bridging-devices 22 which do not have an operative link 24 or 26 connected to their upper port 34 or their lower port 36, respectively. The 'stand-alone' type refers to bridging-devices which are not connected to operative links in both ports 34 and 36, and thus do not belong to a loop.

It is noted that by using wire 30 for notifying failures in switch 20, the time required to activate the port to redundant link 26 in case of a failure in a link 24 is much shorter than if the notification is performed through links 24. The delay through links 24 is due, among other reasons, to the passage of the messages through different layers of software, to initialization periods after reset, and/or to loss of packets. The delay is also due to time-out delays imposed because of the possibility of such packet losses and because of variations in the lengths of initialization periods.

In some preferred embodiments of the present invention, the notification of failures in links 24 is performed through links 24 in addition to, or instead of, the notification on wire 30. In a preferred embodiment of the present invention, each bridging-device 22 which detects an inoperative link 24 sends a control message to bottom bridging-device 22D. Preferably, the control message is sent repeatedly, as is known in the art, to cover for a case in which some of the messages get lost. Since bridging-devices 22 on both sides of the inoperative link 24 send the control message, the message will be received by bottom bridging-device 22D despite the lack of connectivity in switch 20 due to the failure.

Alternatively, control messages reporting the failure are sent to both top bridging-device 22A and bottom bridging-device 22D such that one of these bridging-devices receives the message, even if, due to the failure, some of the control messages do not reach their destination. Preferably, a hardware control connection along redundant link 26 is used by top bridging-device 22A to notify bottom bridging-device 22D that the port to redundant link 26 should be activated.

In some preferred embodiments of the present invention, the control message sent to bottom bridging-device 22D identifies the inoperative link 24'. When the link 24' is again operative the notifying bridging-device 22 sends another control message to bottom bridging-device 22D, along links 24, notifying that the link 24' is again operative. If there are no other inoperative links 24' in switch 20, bottom bridging-device 22D blocks redundant link 26 and sends a message to the notifying bridging-device 22 informing that the redundant link was blocked. The notifying bridging-device 22 then activates its port to the re-operative link 24'.

Alternatively or additionally, top bridging-device 22A sends control messages to bottom bridging-device 22D, periodically. If the control messages are not received in bottom bridging-device 22D for a predetermined time, bottom bridging device 22D activates port 36 leading to redundant link 26.

Although the above described embodiment relates to a switch in which bridging-devices 22 are stacked one on top of the other and redundant link 26 connects the bottom and top bridging-devices 22D and 22A, these details of construction are in no way required to implement the invention. Rather, the bridging-devices 22 may be organized in any other physical relationship which has a ring topology. Furthermore, the redundant link may be substantially any of the links in a switch and there is no need that the redundant link be different than any of the other links. Likewise, the bridging-device which blocks the redundant link may be any of the bridging-devices 22.

Figure 3:
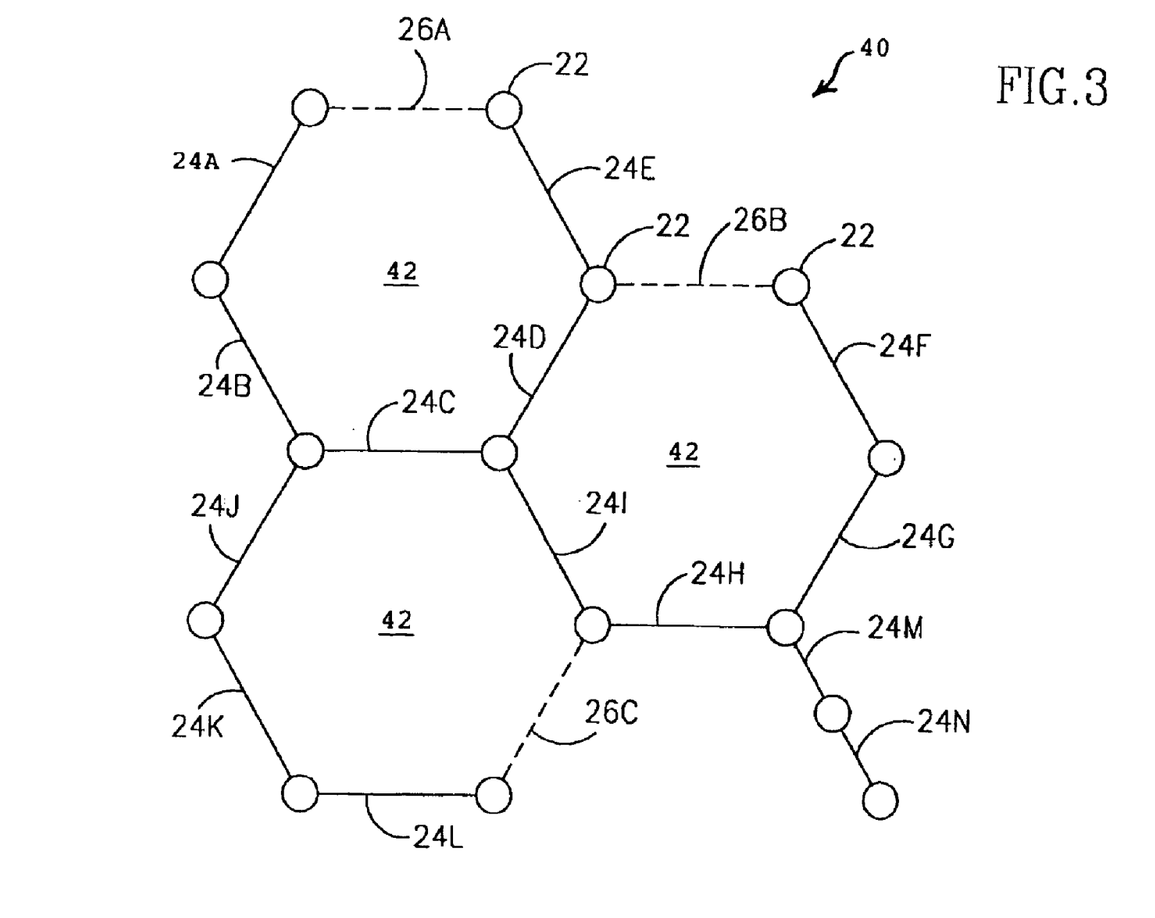
FIG. 3 is a schematic graph of a network including a plurality of loops, in accordance with a preferred embodiment of the present invention.

FIG. 3 is a schematic graph of a network 40, in accordance with a preferred embodiment of the present invention. Network 40 comprises a plurality of bridging-devices 22 and links 24A, 24B, . . . , 24N and 26A, 26B and 26C, some of which are organized in a plurality of loops 42. Each loop 42 is assigned a redundant link 26 which is only activated if one of links 24 in its respective loop fails. Preferably, each redundant link 26 is associated with one or more links 24. When all the associated links 24 of a redundant link 26 operate, the redundant link is blocked. If, however, one of the associated links 24 fails the redundant link is activated.

In FIG. 3, a first loop includes links 24A, 24B, 24C, 24D, 24E and 26A. A second loop includes links 24D, 24F, 24G, 24H, 24I and 26B. A third loop includes links 24C, 24I, 24J, 24K, 24L and 26C. Links 24D, 24C and 24I are common to two loops. It is noted that two or more loops may have more than one link in common, and/or a loop may have no links which are common with any other loops. Links 24M and 24N do not belong to any loops. In each loop, one of the links is preferably chosen arbitrarily as the redundant link. In a preferred embodiment of the present invention, a link which belongs to only one loop is chosen as the redundant link. Alternatively, a link which is common to more than one loop is chosen as the redundant link for one of the loops to which it belongs. The activation scheme described below is planned in a manner which prevents the activation of the redundant link due to a failure in one loop from closing another loop. For example, instead of pre-designating link 26B as the redundant link for the second loop, link 24I could be designated as the redundant link. However, pre-designating links 24C, 24D and 24I as the redundant links is not feasible since this would leave a loop in network 40.

In a preferred embodiment, links 24A, 24B, 24C, 24D and 24E are associated with redundant link 26A. Links 24F, 24G, 24H and 24I are associated with redundant link 26B, and links 24J, 24K and 24L are associated with redundant link 26C. Links 24M and 24N are not associated with any redundant link and are not compensated for, in case they fail.

Preferably, each link 24 is assigned one or more bridging-devices 22 which are in charge of notifying whether the link 24 is operative. Likewise, each redundant link 26 is preferably assigned a single bridging-device which is in charge of activating and blocking the redundant link. In some preferred embodiments of the present invention, each group of bridging-devices assigned to a group of associated links are connected to a common control wire (not shown) similar to control wire 30, and optionally also wire 32, of FIG. 1. It is noted, that a single bridging-device may be connected to two different control wires for two different links. Thus, each bridging-device 22 assigned to a redundant link 26 receives operativeness information only for links 24 associated with their redundant link.

In a preferred embodiment of the present invention, links common to more than one loop may be compensated for, in case of their failure, by more than one redundant link 26, in the alternative. Thus, a link common to more than one loop is not always compensated for by the same redundant link 26. Rather, the redundant link 26 compensating for failure of the link which is common to more than one loop is chosen depending on the operability of the other links associated with the redundant links. For example, in addition to the rules described above, redundant link 26C may be activated if link 24C is inoperative and one or more of links 24A, 24B, 24D and 24E is inoperative. By adding more redundant links it is possible to compensate for more cases of multiple failures.

Preferably, each redundant link has a table which specifies the conditions under which the link is to be activated. Preferably, the bridging-devices 22 assigned to respective redundant links 26 receive indication on the operativeness of those links 24 mentioned in the table of their redundant link. In a preferred embodiment, the bridging-devices 22 assigned to redundant links 26 receive operativeness information about substantially all the links 24 in network 40.

Preferably, any number of additional bridging-devices 22 and links 24 may be added to the loops 42 of network 40, for example between links 24A and 24B, without changing any of the entries of the tables of the redundant links which regard to links 24 formerly located in network 40. In a preferred embodiment of the invention, additional links 24 added between links 24A and 24B are regarded by the tables of the redundant links 26 in substantially the same manner in which links 24A and/or 24B are regarded.

It is noted that the principles of the present invention may be used for more complex topology switches. In such complex topology switches a failure may incur activation of more than one link and blocking of at least one link. It is further noted that the principles of the present invention are not limited in application to stackable switches. These principles may be applied to many types of modular switches, especially those which have a separate CPU for each bridging-device. These principles may also be applied to entire local area networks and/or to other sub-networks. Furthermore, the term bridging-device in the present application includes, but is not limited to, hardware bridging-devices which either have a separate controlling CPU or do not have a separate CPU and bridging-devices which are implemented at least partially in software. It is noted that the bridging-devices may be implemented as layer 2 (data link layer) of the OSI model media access control (MAC) units of an end station. In addition, the term bridging-device includes devices which perform tasks belonging to more than one layer of the OSI model. Such devices may belong primarily to layers other than layer 2 of the OSI model, and perform bridging between their ports in addition to their primary functions (e.g., routers of layer 3). In addition, such devices may be directed equally to tasks of more than one layer (e.g., layer 3 switches).

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using non-limiting detailed descriptions of preferred embodiments thereof that are provided by way of example and are not intended to limit the scope of the invention. Variations of embodiments described will occur to persons of the art. Furthermore, the terms "comprise," "include," "have" and their conjugates, shall mean, when used in the claims, "including but not necessarily limited to." The scope of the invention is limited only by the following claims:

What is claimed is:

1. A method of managing connectivity of a cluster of bridging-devices including a plurality of links, comprising:
   pre-designating at least one of the links as a redundant link which is blocked under a normal operating condition when all the other links are operative and connected in accordance with a predetermined scheme;
   determining connectivity data on the connectivity of the links of the cluster; and
   activating or blocking the pre-designated redundant at least one link responsive to the connectivity data;
   wherein if the pre-designated redundant at least one link is activated under the normal operating condition, the cluster of bridging-devices is interconnected in a ring topology; and
   wherein if the pre-designated redundant at least one link is blocked under the normal operating condition, the cluster of bridging-devices is not interconnected in a ring topology.

2. A method according to claim 1, wherein pre-designating at least one of the links comprises pre-designating links which are in excess of the number of links required to form a spanning tree of the cluster.

3. A method according to claim 1, wherein pre-designating at least one of the links comprises pre-designating at least one redundant link for each loop in the cluster.

4. A method according to claim 1, wherein determining the connectivity data comprises determining the operability of at least one of the links of the cluster.

5. A method according to claim 4, wherein determining the connectivity data comprises determining the operability of a plurality of links associated with the redundant link.

6. A method according to claim 1, wherein determining the connectivity data comprises determining whether a loop of operative links including the redundant link exists in the cluster.

7. A method according to claim 6, wherein activating or blocking the redundant link comprises blocking the redundant link if all of the links in the loop are operative, and activating the redundant link if at least one of the links in the loop is inoperative.

8. A method of managing connectivity of a cluster of bridging-devices including a plurality of normally active primary links and at least one normally blocked redundant link, comprising:

receiving, by a managing bridging-device, which is directly connected to at least one of the redundant links, information on the operability of a group of the primary links, from at least one other bridging-device; and blocking or activating the redundant link responsive to the operability information;

wherein if the at least one normally blocked redundant link is activated under a normal operating condition, the cluster of bridging-devices is interconnected in a ring topology; and wherein if the at least one normally blocked redundant link is blocked under the normal operating condition, the cluster of bridging-devices is not interconnected in a ring topology.

9. A method according to claim 8, wherein receiving the information comprises receiving the information on a wire independent of the primary links.

10. A method according to claim 9, wherein receiving the information comprises receiving a binary signal.

11. A method according to claim 10, wherein the binary signal is a result of a logical operation applied to signals generated respectively by a plurality of the bridging-devices of the cluster.

12. A method according to claim 8, wherein the group of primary links defines a ring topology with the redundant link.

13. A method according to claim 8, wherein blocking or activating the redundant link comprises blocking the redundant link if all of the primary links in the group are operative, and activating the redundant link if at least one of the links in the group is inoperative.

14. A method according to claim 13, wherein a link is considered operative if it is operative and is connected to at least two operative ports of at least two powered operative links.

15. A method according to claim 8, wherein the group of primary links comprises at least one link not directly connected to the managing bridging-device.

16. A method according to claim 8, comprising notifying by the managing bridging-device to at least one of the other bridging-devices in the cluster before the managing bridging-device activates the redundant link.

17. A method according to claim 8, comprising waiting a predetermined period in which no changes occur in the operation of the links of the group before activating the redundant link.

18. A method according to claim 8, wherein the managing bridging-device is connected to the redundant link through a predetermined port.

19. A method according to claim 8, wherein only the managing bridging-device is permitted to change the status of an operative link from active to blocked.

20. A method of managing activity of ports of a bridging-device belonging to a cluster of bridging-devices, comprising:

determining whether the bridging-device is connected to a specific link serving as a redundant link; and if the bridging-device is directly connected to the redundant link, receiving information by the directly connected bridging-device on the operability of a group of primary links, and determining whether to block the redundant link responsive to the received information;

wherein the redundant link is blocked when all of the links in the group of the primary links are operative;

wherein if the redundant link is activated under a normal operating condition, the cluster of bridging-devices is interconnected in a ring topology; and wherein if the redundant link is blocked under the normal operating condition, the cluster of bridging-devices is not interconnected in a ring topology.

21. A modular switch, comprising:

a plurality of bridging-devices;

a plurality of primary links connecting the bridging-devices;

a redundant link; and a control wire which carries a signal indicative of the operability of at least one of the primary links;

wherein at least one of the bridging-devices determines whether the redundant link should be blocked responsive to the signal on the control wire;

wherein if the redundant link is activated under a normal operating condition, the plurality of bridging-devices is interconnected in a ring topology; and wherein if the redundant link is blocked under the normal operating condition, the plurality of bridging-devices is not interconnected in a ring topology.

22. A switch according to claim 21, comprising a feedback control wire which carries a signal which indicates whether the redundant link is blocked.

23. A switch according to claim 21, wherein the at least one bridging-device which determines whether the redundant link should be blocked is substantially identical in its hardware to the other bridging-devices.

24. A switch according to claim 23, wherein the at least one bridging-device which determines whether the redundant link should be blocked runs substantially identical software as the other bridging-devices.

25. A switch according to claim 21, wherein the group of primary links and the redundant link define a ring topology.

26. A modular switch, comprising:

a plurality of identical bridging-devices comprising internal ports; and a plurality of data links connecting the plurality of bridging-devices, wherein a specific one of the identical bridging-devices determines whether to activate or block its internal ports in a manner different from the other bridging-devices;

wherein at least one of the plurality of data links comprises a redundant data link and further wherein the redundant data link is blocked when the remainder of the plurality of data links are operative;

wherein if the redundant data link is activated under a normal operating condition, the plurality of bridging-devices is interconnected in a ring topology; and wherein if the redundant data link is blocked under the normal operating condition, the plurality of bridging-devices is not interconnected in a ring topology.

27. A switch according to claim 26, wherein only the specific bridging device may block an operative link.

28. A switch according to claim 26, wherein the specific bridging device comprises a bridging device connected to a link which is normally blocked.

* * * * *